United States Patent
Premathilake et al.

(10) Patent No.: US 7,556,738 B2
(45) Date of Patent: Jul. 7, 2009

(54) METHOD FOR DETERMINING THE DURATION OF A BRINE/SLOW RINSE CYCLE FOR A WATER CONDITIONER

(75) Inventors: Kumudika Premathilake, Rolling Meadows, IL (US); John VanNewenhizen, Mundelein, IL (US)

(73) Assignee: Culligan International Company, Rosemont, IL (US)

( * ) Notice: Subject to any disclaimer, the term of this patent is extended or adjusted under 35 U.S.C. 154(b) by 565 days.

(21) Appl. No.: 11/138,179

(22) Filed: May 26, 2005

(65) Prior Publication Data

US 2006/0266710 A1    Nov. 30, 2006

(51) Int. Cl.
C02F 1/42    (2006.01)
(52) U.S. Cl. .................. 210/662; 210/670; 210/746
(58) Field of Classification Search .......... 210/662, 210/673, 746, 670
See application file for complete search history.

(56) References Cited

U.S. PATENT DOCUMENTS

| | | | |
|---|---|---|---|
| 3,176,844 A | 4/1965 | Nelson | |
| 3,383,310 A | 5/1968 | Ammer | |
| 3,768,649 A | 10/1973 | Fleckenstein | |
| 3,990,066 A | 11/1976 | Malmgren | |
| 4,299,698 A * | 11/1981 | Rak et al. ............ | 210/96.1 |
| 4,320,010 A | 3/1982 | Tucci et al. | |
| 4,814,090 A | 3/1989 | Kunz et al. | |
| 4,917,794 A | 4/1990 | Fettes et al. | |
| 4,937,557 A | 6/1990 | Tucci et al. | |
| 5,234,601 A * | 8/1993 | Janke et al. ............ | 210/662 |
| 5,480,555 A | 1/1996 | Momber | |
| 5,680,055 A | 10/1997 | Seitz et al. | |
| 5,699,272 A * | 12/1997 | Zabinski ............ | 700/266 |
| 6,078,178 A | 6/2000 | Barnett | |
| 6,217,751 B1 | 4/2001 | Peeters | |
| 6,696,966 B2 | 2/2004 | Bearak | |

FOREIGN PATENT DOCUMENTS

JP    60150840 A  *  8/1985

* cited by examiner

Primary Examiner—Matthew O Savage
(74) Attorney, Agent, or Firm—Greer, Burns & Crain, Ltd.

(57) ABSTRACT

An apparatus and method for determining the end of a service step and the duration of a brine/slow rinse step in a water conditioner having a bed of ion-exchange material. A sensor probe and a reference probe are positioned in the bed of ion-exchange material vertically displaced from each other. Voltage from each of the probes are monitored over a plurality of time intervals. When the percent increase in the impedance ratio exceeds a pre-specified value the end of a service step is identified and a regeneration cycle is initiated. During the regeneration step, the rate of change in the impedance ratio of the sensor probe to the reference probe is calculated and used to detect two peaks in the rate of change of impedance ratio between the sensor probe and the reference probe, followed by terminating the brine/slow rinse step after both peaks have been detected.

10 Claims, 4 Drawing Sheets

METHOD FOR DETERMINING THE DURATION OF A BRINE/SLOW RINSE CYCLE FOR A WATER CONDITIONER

FIELD OF THE INVENTION

This application relates to control sequences for automatic water conditioning products. More specifically, it relates to a method for determining the end of a service cycle and the duration of the brine/slow rinse cycle during regeneration of an automatic water conditioner, and an apparatus that employs the method.

BACKGROUND

While treating hard water, a bed of ion exchange resin or other material in a water conditioner removes calcium and magnesium ions from the water and replaces them with sodium ions. As the hard water passes through the bed, it exchanges these hard water ions with sodium in the first soft resin it meets, creating a front or wave of ion-exchange activity called the reaction zone. The bed becomes ineffective for softening and must be periodically regenerated when the amount of available sodium is depleted and the ion-exchange material is saturated with calcium and magnesium. Water treatment is then suspended while the ion-exchange material is regenerated in a multi-step process to flush the calcium and magnesium ions from the resin and restore the sodium level.

A series of steps is used to replace the hard water ions with sodium ions, making the ion-exchange material active again for water conditioning. Typically, the bed is first backwashed, by reversing the flow of the incoming water, to remove sediment and loosen the bed. Next, the bed is contacted with a downflowing brine solution, whereby the ion-exchange material takes sodium ions from the high concentration brine solution and displaces the calcium and magnesium ions into the brine and out to waste. When an optimum amount of brine solution has been delivered, rinsing continues until virtually all traces of the brine solution and the unwanted hard water ions in it are discharged from the bed. After being rinsed to remove residual brine, the bed has been restored to the sodium state, known as soft resin, and is then returned to service treating hard water.

Preparation of the brine solution typically takes place in a brine tank that is kept separate from the resin tank. The brine tank, which contains a supply of salt, is filled with a measured amount of water to form a saturated salt solution. The salt supply must be replaced periodically due to depletion after repeated regenerations. If the salt level is too low to make a brine solution of a given strength, there will be an insufficient sodium level to drive the exchange of calcium and magnesium ions and the resin will not effectively treat the hard water when it is placed back in service.

Most modern water conditioners such as water softeners and the like use electronic controllers to perform calculations, monitor sensors, direct timing and control valves during the various process steps. Some newer, more sophisticated water conditioners use electronics to schedule the next regeneration cycle based on one or more inputs. The input data includes, for example, information from timers, flow meters, stored historical data on water usage and the like. Many control sequences have been devised to determine the sequence and duration of the various steps required during regeneration of a water conditioner. In a simple regeneration sequence, each step is a fixed length of time, regardless of the degree of calcium and magnesium saturation of the resin. To ensure that the bed was fully regenerated, the duration of each step would have to be at least the time necessary for that process step, assuming that the resin was completely saturated with hard water ions at the start of the regeneration. Using this technique, the same amount of time and brine are used regardless of whether the resin is 10% saturated, 40% saturated or 90% saturated, resulting in a waste of time and salt when the resin is less than saturated with hard water ions.

When designing a regeneration control sequence, it is preferable to minimize the duration of the regeneration process for a number of reasons. While the unit is being regenerated, it is out of service for softening water. Most consumers want their water conditioner to provide soft water on demand, even very late at night or very early in the morning. Reducing the amount of time the unit is out of service decreases the probability that soft water will be unavailable when needed. Using less salt and water for regeneration reduces the cost of operation. There is also a need to minimize the amount of brine discharged from the water conditioner to the environment. Reducing the duration of the brine cycle helps to minimize the use of brine, thereby reducing the impact on the environment.

In U.S. Pat. No. 5,699,272, the duration of a rinse cycle is determined using the difference in voltage between a sensor probe and a reference probe by looking for three distinct states. The first state occurs when the bed is totally surrounded by sodium ions at the beginning of the brine/slow rinse cycle or step, indicating that the brine has filled the bed. As the delivery of brine stops and the rinse water washes the sodium away, a front moves through the bed with a high sodium concentration ahead of it and a low sodium concentration behind it. The second stage occurs when the front is between the sensor probe and the reference probe, indicating that the brine solution is being rinsed from the bed. The third stage occurs when the front has passed the reference probe, both sensors will be in the low sodium solution, signaling that the rinse can be discontinued.

None of the know prior art regeneration schemes consider the effects of manufacturing variations or fouling of the probes or sensors over time. When differences between two probes or between a probe and a reference value are used to determine the end of the cycle, changes can produce the same difference in values as the passing of a front. Further, sensors can become covered with sediment, scale, rust deposits or otherwise fouled, making the sensor less sensitive over time to the changes that surround it. As sensor sensitivity drops, the differences in readings become less distinct and impact the ability to correctly detect the beginning or end of a process step. As a result, the unit can fail to recognize the need to regenerate or it regenerates more frequently than is necessary.

Additionally, plating of the sensors causes the comparator to signal for premature regeneration because the impedance steadily increases. As a result, reserve capacities are increased and softener efficiency is decreased, leading to a waste of water and salt.

Further, the prior art use sensor readings in fixed comparisons or compare them to predetermined values. It is difficult to compensate for a replacement sensor that gives slightly different impedance readings due to manufacturing differences. The available software cannot account for sensors that have become plated from years of exposure to minerals in a flowing water environment. The fixed or predetermined values may take into account initial states of some of these variables, but cannot compensate for changes over time.

Thus, there is a need for a method for determining the duration of the steps in the process cycle of a water conditioner that maintains accuracy over long periods of time. The method should accurately determine the termination of the service step or a brine/slow rinse step in spite of fouling or replacement of one or more of the sensor probes.

SUMMARY OF THE INVENTION

These and other problems are addressed by the present method for determining the duration of at least one of a service step or cycle and a brine/slow rinse step or cycle ("step" and "cycle" are used interchangeably herein in relation to operational phases of a water conditioner) in a process cycle for a water conditioner having a bed of ion-exchange material. The method includes positioning a sensor probe and a reference probe in the bed of ion-exchange material vertically displaced from each other, with the sensor probe upstream of the reference probe. Voltage from each of the sensor probe and the reference probe are monitored and the impedance ratio of the sensor probe to the reference probe is calculated over a plurality of time intervals. During the service step, when the percent difference of the current impedance ratio to the minimum impedance ratio exceeds a first minimum increase, termination of the service step is scheduled and the brine/slow rinse step is initiated. During the brine/slow rinse step in the regeneration cycle, the voltage from each of the sensor probe and the reference probe are monitored and a rate of change in the impedance ratio of the sensor probe to the reference probe is calculated. Calculating a rate of change in the impedance ratio allows for detection of a minimum and a maximum peak during the brine/slow rinse cycle. The first peak in the rate of change of impedance ratio, is detected when the impedance ratio is minimum. The monitoring, calculating and detecting steps are repeated until a second peak is detected. The second peak in the rate of change in the impedance ratio is detected when the impedance ratio is maximum. The brine/slow rinse cycle is terminated after both peaks are detected followed by a pre-specified lag time.

A water conditioner having a bed of ion-exchange material includes a sensor probe positioned in the bed and a reference probe positioned in the bed downstream of the sensor probe. A circuit is configured for monitoring a voltage from each of the sensor probe and the reference probe over a plurality of time intervals. The apparatus also includes a controller configured for monitoring the voltages of the sensor probe and the reference probe and calculating the impedance ratio of the sensor probe to the reference probe. A calculated impedance ratio is used to determine the duration of at least one of the service step and the brine/slow rinse step. If in the service step, the controller also calculates the percent difference in the current impedance ratio to the minimum impedance ratio of the cycle, and schedules regeneration if the percent difference exceeds a first predetermined value. If the process cycle is in the brine/slow rinse step, the controller detects a peak in the rate of change of the impedance ratios, repeats the monitoring and calculating steps until a second peak is detected, and terminates the brine/slow rinse step when both peaks are detected.

The water conditioner apparatus and the method for operating it do not have many of the disadvantages of the prior art. An important feature of the present water softening system and method is that detection of process events is based on a relative impedance ratio, as opposed to an absolute impedance ratio. Use of relative impedance ratios eliminates the effect of factors that change the sensor readings by a multiple of the true reading. Furthermore, we also measure the degree of change in the relative impedance ratio as opposed to an absolute pre-determined impedance ratio. This helps to compensate for problems posed by various manufacturing differences, field conditions and the inevitable "aging" of sensors placed in a flowing water environment for years.

DETAILED DESCRIPTION OF THE DRAWINGS

DETAILED DESCRIPTION OF THE INVENTION

Water conditioners that utilize sensors in a bed of ion exchange material to signal regeneration are well known, such as U.S. Pat. Nos. 4,257,887; 4,299,698; 5,699,272 and 5,751,598 to Culligan International Co., each of which is fully incorporated herein by reference.

Figure 1:
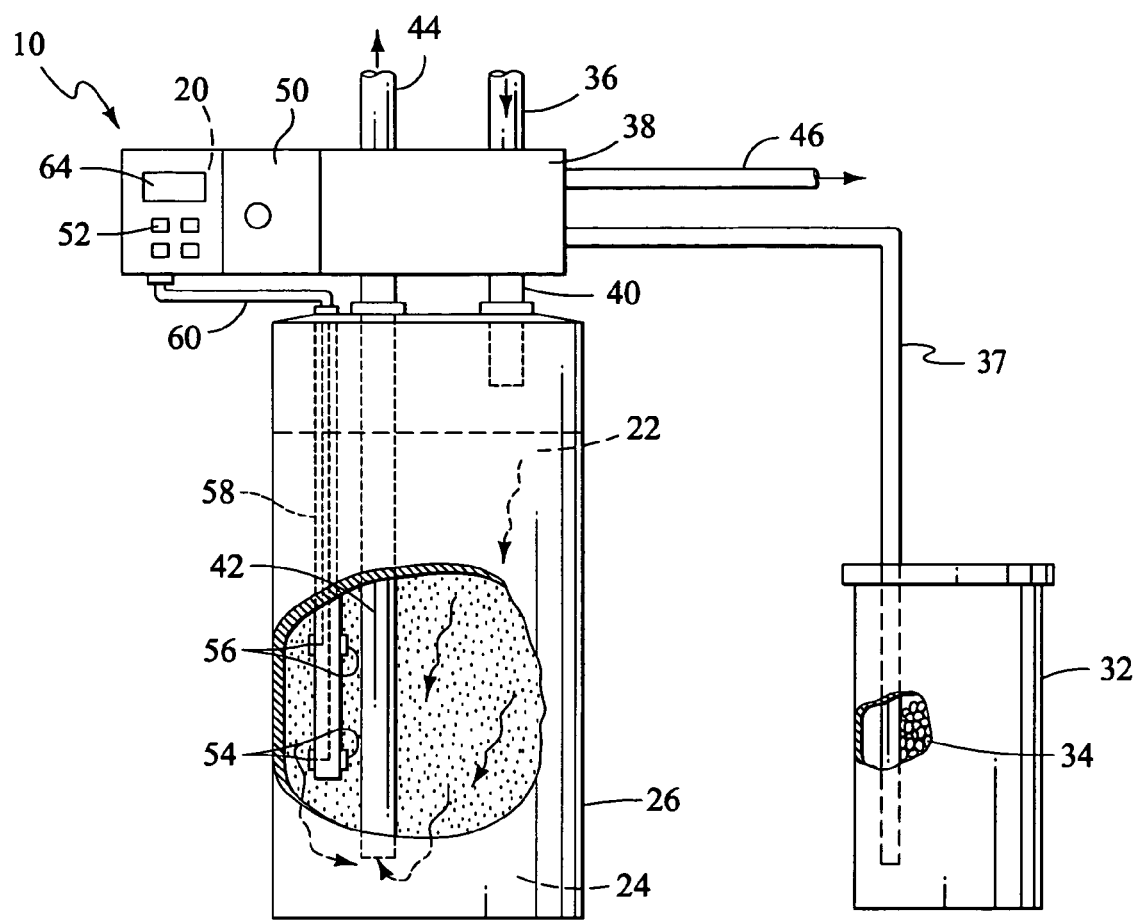
FIG. 1 is an elevational view of a water softening system of the type suitable for use with the present invention, with portions shown cut away for clarity.

Referring to FIG. 1, a water conditioning system or conditioner, generally designated 10, has a bed 14 of an ion exchange material 16 capable of receiving hard water ions from hard water during a softening step and releasing the hard water ions during a regeneration step. The conditioner has a controller, generally designated 20, to control the steps of the program cycle that, among other things, initiate and terminate the regeneration steps to replenish the sodium content of the ion-exchange material 16 when it becomes depleted. For the purposes of this discussion, the bed 14 has a top 22 that is defined as the upstream portion of the bed or the portion of the bed first contacted by hard water as it flows through the ion-exchange bed during the service step. The bed 14 has a bottom 24 that is defined as the downstream portion of the bed or the portion of the bed last contacted by the softened water before exiting the ion-exchange bed during the service step. Any other directional references are to be interpreted as though the water conditioning system 10 is oriented as shown in FIG. 1.

The conditioner 10 includes a housing or tank 26 that holds a quantity of the ion exchange material 16. The ion exchange bed 14 includes a bed of any material 16 that removes hard water ions as will be known to those skilled in the art. Ion-exchange resins are a preferred ion-exchange material 16. Generally, the ion-exchange resin 16 is a polymeric bead with functional groups attached to the polymer to provide the ion exchange function. Ion exchange takes place on either the cation or the anion depending on the functional groups attached to the polymer. Zeolites are also known as ion-exchange materials 16. As raw water rich in hard water ions, such as calcium and magnesium, passes through the bed 14, the hard water ions are exchanged for soft water ions, such as sodium. In the preferred embodiment discussed below, the ion-exchange material 16 is discussed in terms of the ion exchange resin, however, the use of other ion-exchange materials is also contemplated for use in all embodiments.

When the conditioner 10 is designed for home use, the housing 26 is generally a single unit, however, other suitable conditioners 10 optionally have two or more parts that constitute the housing. In the preferred embodiment, the resin tank 26 is surrounded by a brine tank or salt chamber 32. Other conditioners 10 are known having separated resin tanks 30 and brine tanks 32 (FIG. 1). Where it is necessary to have an uninterrupted soft water supply, multiple resin tanks 30 may be used so that one unit is softening while one or more others are regenerating. For the purposes of this invention, the housing 26 encloses all such individual units.

The water conditioner 10 also has a softening salt 34 in the salt chamber 32. Sodium salts, such as sodium chloride in pellets, in a solid block or in a granular form, are the most common softening salts 34, but any solid salt capable of exchanging for hard water ions, such as a potassium salt, is contemplated for use with this invention. High purity salts are recommended to lengthen the time between salt additions and to reduce the amount of impurities that accumulate in the bottom of the water conditioner 10, but salt purity does not directly effect the operation of the controller 20 or the conditioner 10 described herein. Water is added to the salt chamber 32 so that the softening salt 34 dissolves, making the saturated brine (not shown) to be used during the subsequent regeneration. The brine is kept separate from a hard water supply 36 and the ion-exchange material 16 while softening is taking place so that the brine does not contaminate the softened water, and because ion exchange between the resin 16 and the hard water would not occur efficiently in the presence of the brine. Only during the regeneration step is the brine brought into contact with the ion exchange resin 16 via a line 37 through a control valve 38 and an inlet 40.

Still referring to FIG. 1, during softening, the controller 20 operates valve 38 to allow the hard water from the hard water supply 36 to flow into the resin tank 26 through the inlet 40, and soft water exits through a pipe 42 to an outlet 44 which supplies soft water to a water system (not shown). Between the inlet 40 and the outlet 44, the hard water contacts the sodium-rich ion-exchange resin 16, where hard water ions, including calcium and magnesium ions, are received by the resin, and sodium ions are released into the soft water. Softened water is discharged from the conditioner 10 through the outlet 44. When hard water enters the resin bed 14 a distinct interface emerges between the hard water and exhausted resin 16 upstream of the bed and soft water and sodium-state resin downstream of the bed. This interface allows the controller 20 to measure and detect a relative impedance ratio increase. When the resin 16 is saturated with hard water ions and the sodium or potassium ions are depleted, the resin is regenerated as described above. Spent brine is removed through to a drain pipe 46.

The controller 20 initiates and controls the steps of the process cycle. For the purposes of this invention, the controller 20 includes at least a microprocessor or micro-computer control unit 50 and a user interface 52. Some duties of the unit controller 20 include timing of the softening and regeneration steps, and the opening and closing of valves 38 as appropriate. The controller 20 may perform other tasks as well. Most modern water softening systems include a microprocessor 50 in the controller 20. It should be appreciated that the microprocessor 50 may have functions not specifically described in this application that are not a part of this invention, even when carried out by the same or similar equipment.

Preferably, process steps are directed by the controller 20 by movement of the one or more control valves 38. In the preferred embodiment, the valve 38 positions determine whether hard water or brine flows into the resin tank 26. Any electronically actuated valve 38 is suitable for the valve, including solenoid valves, or valves controlled by an electronically controlled rotary cam.

There are a number of steps in the process cycle. During the softening or service step, hard water from the supply 36 flows into the resin tank 26, then to the pipe 42 to supply soft water to the water supply 44. Upon completion of the softening step, there is a backwash step whereby the hard water enters at the bottom of the pipe 42 and flows upward through the bed 14, exiting at the inlet 40 and going to the drain 46. This step loosens the particulates in the bed 14 that have become compacted due to gravity and downward flow of the water being softened, and also removes solid impurities that may have become lodged in the bed.

At the conclusion of the backwash step, brine is introduced into the bed 14 from the brine tank 32. The amount of salt 34 to be used in making the brine is input to the controller 20 at a user interface 52, such as a keypad or touch screen. A suitable amount of water is added to the salt 34 as determined by the controller 20. When the resin 16 is being regenerated, the control valve 38 is repositioned to drain brine from the brine tank 32 and send it to the resin tank 30.

As the brine is pumped into the resin bed 14, it effectively surrounds the resin 16 with sodium ions. Because of the high sodium concentration, equilibrium favors replacing the hard water ions with sodium ions in the resin 16, and allowing the hard water ions to exit with the brine. A first front emerges between the brine upstream and the hard water downstream. After contacting the resin 16, the spent brine is discharged to the drain 46 and a slow rinse begins.

When the brine is spent, the slow rinse begins, directing hard water to enter at the top of the resin tank 30 to wash away brine remaining in the bed 14 and begin softening. A second front or interface marks the softened water upstream and spent brine downstream. When all of the brine has been flushed from the resin tank 26, the unit is returned to service generating softened water. A third front is created as the resin 16 in the bed 14 progressively gives up the sodium ions and exchanges them with hard water ions. This third front is characterized by hard water upstream and soft water downstream of the front.

The controller 20 is driven by a set of instructions, preferably in the form of a software program. Preferably, software is preloaded into memory of the microprocessor 50 at the point of manufacture. Alternately, the instruction set could be loaded onto firmware, such as read-only memory for installation into the microprocessor 50. Any method of electronically storing the instructions is suitable as long as the instructions are readily available to the controller 20 while in use.

The bed 14 of the water conditioner 10 also has positioned within it a reference probe 54 and a sensor probe 56, vertically displaced from each other. Any probe 54, 56 that is capable of indicating a resistance change in the ion-exchange material and the surrounding water is useful. Typically, each of the probes 54, 56 has at least one pair of spaced electrodes, and preferably includes two pair of spaced electrodes. A preferred probe is the AQUASENSOR by Culligan International (Northbrook, Ill.).

A sensor support 58 holds the probes 54, 56 in a fixed position within the bed 14. Between the resin tank 26 and the controller 20, a conduit 60 carries the electrical signals from the probes 54, 56 to the controller. Placement of the reference probe 54 in a particular position is not necessary; however, preferably the probe is positioned near the bottom 24 of the bed 14 to make it easier to estimate when an ion-exchange front or media interface will reach the bottom of the bed. The sensor probe 56 is positioned closer to the top 22 of the bed 14 than the reference probe 54 so that the sensor probe is upstream of the reference probe. The probes 54, 56 are also optionally horizontally displaced. A media interface occurs where there is a change in the liquid media moving through the bed, such as brine, hard water or soft water.

Optionally three or more probes 54, 56 are used in the resin bed 14 to more accurately determine the position of the ion-exchange front or media interface. When the circuit analysis, discussed below, is applied to the probes 54, 56 two at a time, progress of the ion-exchange front or media interface through the bed 14 can be closely monitored. When more than two probes 54, 56 are used, neither the vertical or horizontal displacement between them need be uniform.

Figure 2:
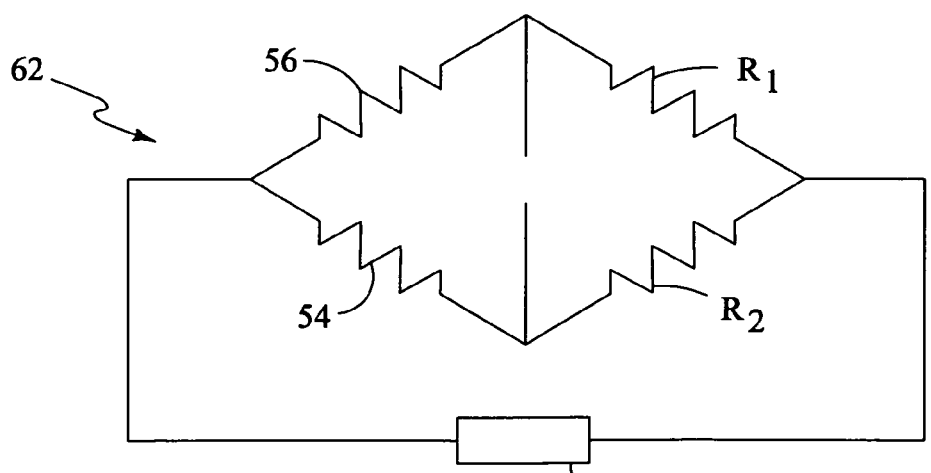
FIG. 2 is a circuit diagram for a Wheatstone Bridge circuit.

Referring now to FIG. 2, preferably, a Wheatstone Bridge, generally 62, is used to monitor the voltage of the sensor probe 56, $V_{sensor}$, and the reference probe 54, $V_{reference}$, at each of a plurality of time intervals. The bridge has two fixed resistors, $R_1$ and $R_2$, having voltages $V_{R1}$ and $V_{R2}$, respectively, and impedances $Z_{R1}$ and $Z_{R2}$, respectively. If Ohm's Law is applied to the sensor leg of the Wheatstone Bridge 62:

$$V_{sensor} = I \times Z_{sensor} \quad \text{(I)}$$

$$V_{R1} = I \times Z_{R1} \quad \text{(II)}$$

where I is the current through the circuit. In a circuit, the equation for impedance is given by:

$$Z = \sqrt{R^2 + (X_L^2 - X_c^2)} \quad \text{(III)}$$

where R is the resistance of the circuit, $X_L$ is the inductive reactance and $X_C$ is the capacitive resistance. For a pure resistor, such as the reference resistors on the circuit board, $X_L$ and $X_C$ are both equal to 0, reducing equation III to:

$$Z = R \quad \text{(IV)}$$

Applying Ohm's law, equation II can be rewritten as:

$$V_{R1} = I \times R_1 \quad \text{(V)}$$

The current through the circuit can be calculated as:

$$I = \frac{V_{R1}}{R_1} \quad \text{(VI)}$$

Since the sensor probe and the fixed resistor $R_1$ are in series, the voltage across $R_1$ is equal to the difference between the total supply voltage, $V_{supply}$, supplied to the circuit and the voltage across the sensor probe 56, $V_{sensor}$. Therefore, $$V_{R1} = (V_{supply} - V_{sensor}) \quad \text{(VII)}$$

Substituting equation VII into equation VI:

$$I = \frac{V_{Supply} - V_{sensor}}{R_1} \quad \text{(VIII)}$$

Substituting equation VIII into Ohm's Law gives:

$$Z_{sensor} = R_1 \times \left\{ \frac{V_{sensor}}{(V_{Supply} - V_{sensor})} \right\} \quad \text{(IX)}$$

Applying the same equations to the reference portion of the Wheatstone Bridge 62 gives:

$$Z_{reference} = R_2 \times \left\{ \frac{V_{reference}}{(V_{Supply} - V_{reference})} \right\} \quad \text{(X)}$$

Using equations IX and X to calculate the ratio, and using established Wheatstone Bridge 62 logic, the impedance ratio becomes:

$$Z_{ratio} = \frac{Z_{sensor}}{Z_{reference}} = \frac{R_1 \times \left\{ \frac{V_{sensor}}{(V_{Supply} - V_{sensor})} \right\}}{R_2 \times \left\{ \frac{V_{reference}}{(V_{Supply} - V_{reference})} \right\}} \quad \text{(XI)}$$

In a preferred embodiment, the fixed resistors $R_1$ and $R_2$ in the Wheatstone Bridge 62 are 200 ohms for $R_1$, and either 215 or 226 ohms for $R_2$. Resistance values may vary to suit the application. The sensor probe 56 and the reference 54 probe are both variable resistors. A 2.5-5.0 voltage is supplied to the Wheatstone bridge circuitry by the controller 20. Referencing the voltage values, $V_{sensor}$ and $V_{reference}$, and the two fixed resistors $R_1$ and $R_2$ in the Wheatstone Bridge circuit 62, a software program can be utilized by microprocessor 50 to calculate the impedance ratio of the sensor probe 54 to the reference probe 56.

Passage of a front is detected by comparing the impedance of the reference probe 54 and the sensor probe 56. The term "front" is intended to include the reaction zone as well as any interface between hard water, soft water and brine. As the environment in the vicinity of the probe changes, the probes 54, 56 will produce varying voltages depending on whether they are surrounded by hard water, soft water or brine. The varying electrical signals from the probes 54, 56 are monitored by the controller 20 and used to determine when either the service step or the brine/slow rinse step is to be terminated. Monitoring occurs over a plurality of time intervals selected so that none of the fronts pass by one of the sensors 54, 56 undetected. Selection of the time interval depends on the liquid flow rates and the vertical separation of the probes 54, 56. Preferably, the time intervals are regularly spaced, although the microprocessor 50 optionally suspends monitoring during periods when no front is expected. The preferred time interval is 30 seconds.

When the service step begins, both probes 54, 56 are in soft water and soft ion-exchange material 16. As softening begins, hard water travels through the resin bed 14, exchanging hard water ions with the sodium ions associated with the resin 16. The hard water ions will exchange with the first sodium ions they contact, creating a front that moves through the bed 14 in the direction of the water flow. Water upstream of the front is hard and water downstream of the front is softened. The impedance ratio will be approximately constant and equal to one, until the ion-exchange front reaches the sensor probe 56. As the ion-exchange front passes the sensor probe 56, the ion-exchange material 16 changes from a regenerated state to a spent state and the surrounding water changes from softened to unsoftened. At this point the reference probe 54 is still in soft water and regenerated resin. As a result, the impedance ratio increases.

When compared to the minimum impedance for the current cycle, a peak is detected when there is the first predetermined increase in the impedance ratio. Values from the same process cycle are used to determine the increase to minimize the effect of external variations including a change in the raw water supply, replacement of a probe and/or fouling of the probes 54, 56 from previous cycles.

The first predetermined increase in the impedance ratio is any value that indicates that the difference between the current impedance ratio and the minimum impedance ratio for that cycle is approaching a maximum. Exact values of the first predetermined increase are determined by characteristics of the probes 54, 56, the fixed resistors on the circuit board and the tolerance for premature regeneration. Increases of from about 5% to about 15% are especially useful when using the preferred AQUASENSOR probe. More preferably, the first predetermined increase in the impedance ratio is from about 7% to about 8%.

If the increase between the minimum impedance ratio and the current impedance ratio exceeds the first predetermined increase for a first minimum time period, then the termination of the service step is executed either immediately or according to a scheduled time delay. Preferably, the difference between the minimum impedance ratio and the current impedance ratio is maintained for at least 4 minutes, more preferably for at least 6 minutes. The exact duration of the peak will depend on a number of process factors, particularly flow rates. When there is a small resin 16 reserve, that is the amount of ion-exchange resin 16 that remains downstream of the sensor probe 56, due to the size of the conditioner 10 or placement of the probes 54, 56, the service step is advantageously terminated immediately. Optionally, termination of the service step is delayed according to any of a number of criteria. When water is currently being used at the time the controller 20 determines the service step should be terminated, regeneration is optionally delayed at least until use of water has stopped or is minimized. If the resin 16 reserve is large enough, regeneration can be delayed until a predetermined time of day. As the ion-exchange front passes the reference probe 54, the impedance ratio decreases to approximately one, since both probes 54, 56 will again be in water and resin 16 the same condition.

At the appropriate time, the controller 20 terminates the service step and initiates the brine/slow rinse step of regeneration. Imbalances between the impedance ratios of the probes 54, 56 are used to determine the duration of the regeneration step in a slightly different way than is used in the service step. More specifically, the impedance ratio between the two probes 54, 56 is determined, and the rate of change in the impedance ratios over a time interval is calculated. When two specific peaks in the rate of change in impedance ratios are detected, the controller 50 terminates the brine/slow rinse step.

At the beginning of the brine/slow rinse cycle, both the sensor 56 and the reference 54 probes are in hard water and spent resin 16, giving impedance ratios that are constant and approximately the same. As the brine passes the sensor probe 56, the reference sensor 54 is still in hard water. At this time, the sensor probe 56 will have a lower resistance than the reference probe 54 due to the relative conductivities of the different solutions. The impedance ratio decreases until the brine interface passes the reference sensor 54 when the impedances will again become equal, giving a constant impedance ratio. This rapid change in impedance ratio while the sensor probe 56 is in brine and the reference probe is in hard water produces a pronounced first minimum peak when the rate of change in impedance ratio is tracked over time. As during the service step, the impedance ratio is calculated based voltage signals of the sensor probe 54 and reference probe 56 detected by the microprocessor 50. When the difference in the impedance peaks exceeds a predetermined first rate change for a predetermined time (preferably 32 sec), the first peak has been detected.

While both probes 54, 56 are in brine during regeneration, the ratio will remain approximately constant and the rate of change near zero. After the brine is expended and rinse water is introduced into the bed 14, a condition occurs when the sensor probe 56 is in rinse water and the reference probe 54 is still in brine. The rinse water is frequently hard water, however, soft water from another resin tank is optionally used. At this time, the sensor probe 56 has a higher resistance than the reference probe 54, which results in rapid change in the impedance ratio. This rapid change in the impedance ratio produces a pronounced second peak when the change in the impedance ratio is tracked over time. Measuring the rate of change in the impedance ratio over time allows the microprocessor to detect the maximum impedance ratio peak when the sensor probe 56 is in soft water and regenerated resin and the reference probe 54 is in spent brine. When both probes 54, 56 are both in soft water and soft resin, the ratio again becomes approximately constant.

Peaks in the rate of change in impedance ratio at the beginning and the end of the brine passing through the bed 14 are clearly recognizable and are useful in monitoring the brine/slow rinse step. Either of the peaks is detected when the rate of change in the impedance ratio exceeds a predetermined rate change. The predetermined rate of change is any value that indicates that the difference between the current impedance ratio and the previous impedance ratio for that cycle is approaching a maximum. Exact values are determined by characteristics of the probes 54, 56 and the tolerance for premature termination of regeneration. Increases in the rate of change in the impedance ratio of from about 0.5% to about 2.5% are especially useful when using the preferred AQUASENSOR probe. When the brine starts through the bed 14, the first predetermined rate change is preferably greater than 2%. Later, as the brine is used up and the second peak proceeds through the bed 14, the second predetermined rate change is preferably greater than 2%.

Preferably, both the predetermined second time and the predetermined third time are at least 30 seconds. The predetermined second time and the predetermined third time can be the same or their values can be very different from each other. If the preferred time interval of 30 seconds is used, detection of the peak is assured if it has a minimum duration that is at least as long as the time interval. More preferably, both the first and second peaks are maintained for at least 32 seconds, and more preferably for one minute or longer.

The duration of any of these process steps depends on a number of factors. The size of the conditioner 10 and the depth of the resin bed 14 determine the maximum vertical spacing between the reference probe 54 and the sensor probe 56. This spacing and the fluid flow rates will at least partially determine how long it takes a front to move the distance between sensors 54, 56. The ion-exchange capacity of the resin 16 at least in part determines how much salt 34 is needed to regenerate and how long the brine wash persists.

Optionally, the microprocessor 50 is configured to include a time out function that terminates the brine/slow rinse step and triggers a warning if either the first peak or the second peak is not found within a reasonable time period. The time period for the time out warning should exceed the expected time for the peaks to pass. A preferred time is slightly longer than the total expected time for the entire regeneration process. The warning is optionally an audible alarm or a visual alarm shown on a display 64.

Figure 3:
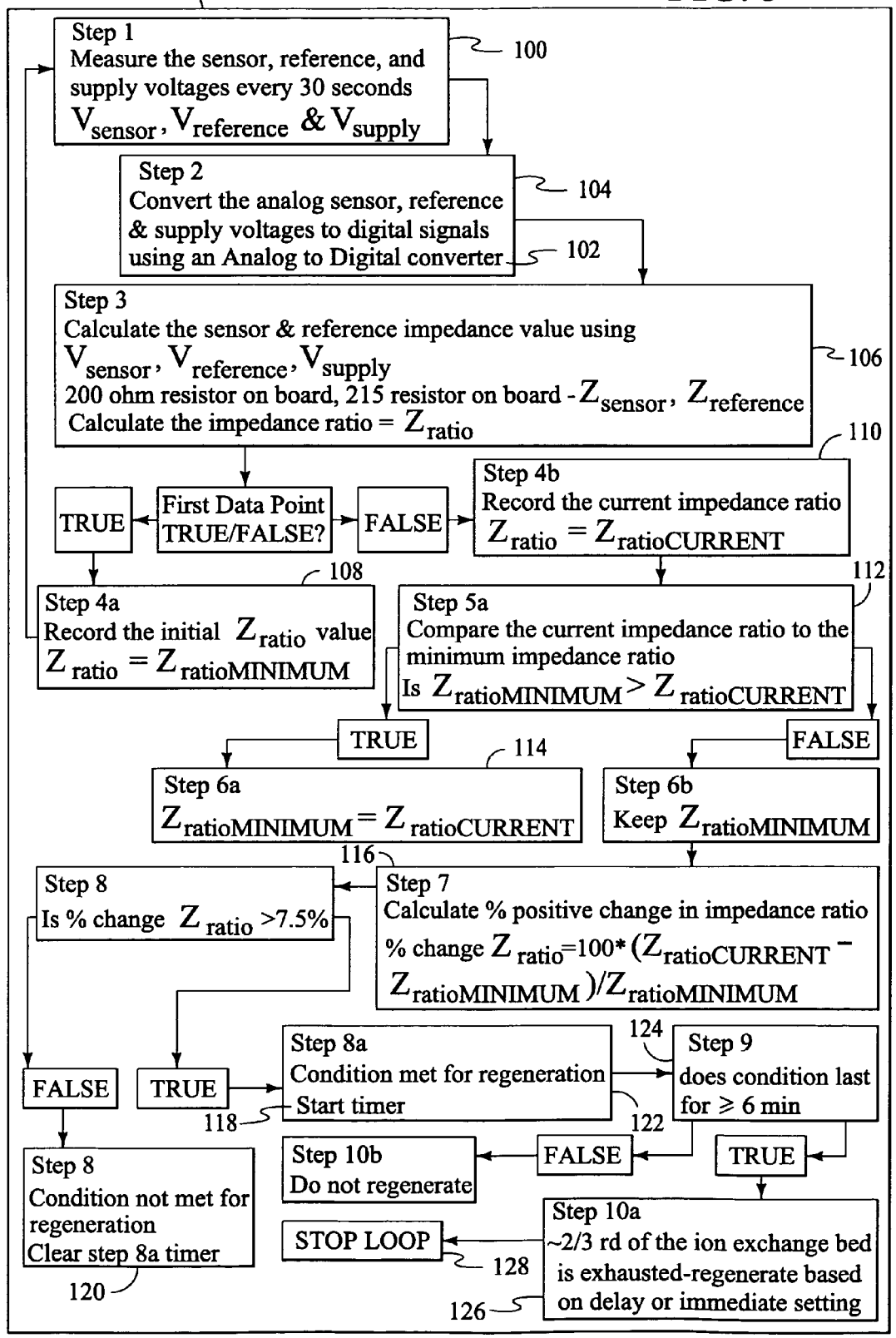
FIG. 3 is a flow diagram of a process for determining the end of the service step.
Figure 4:
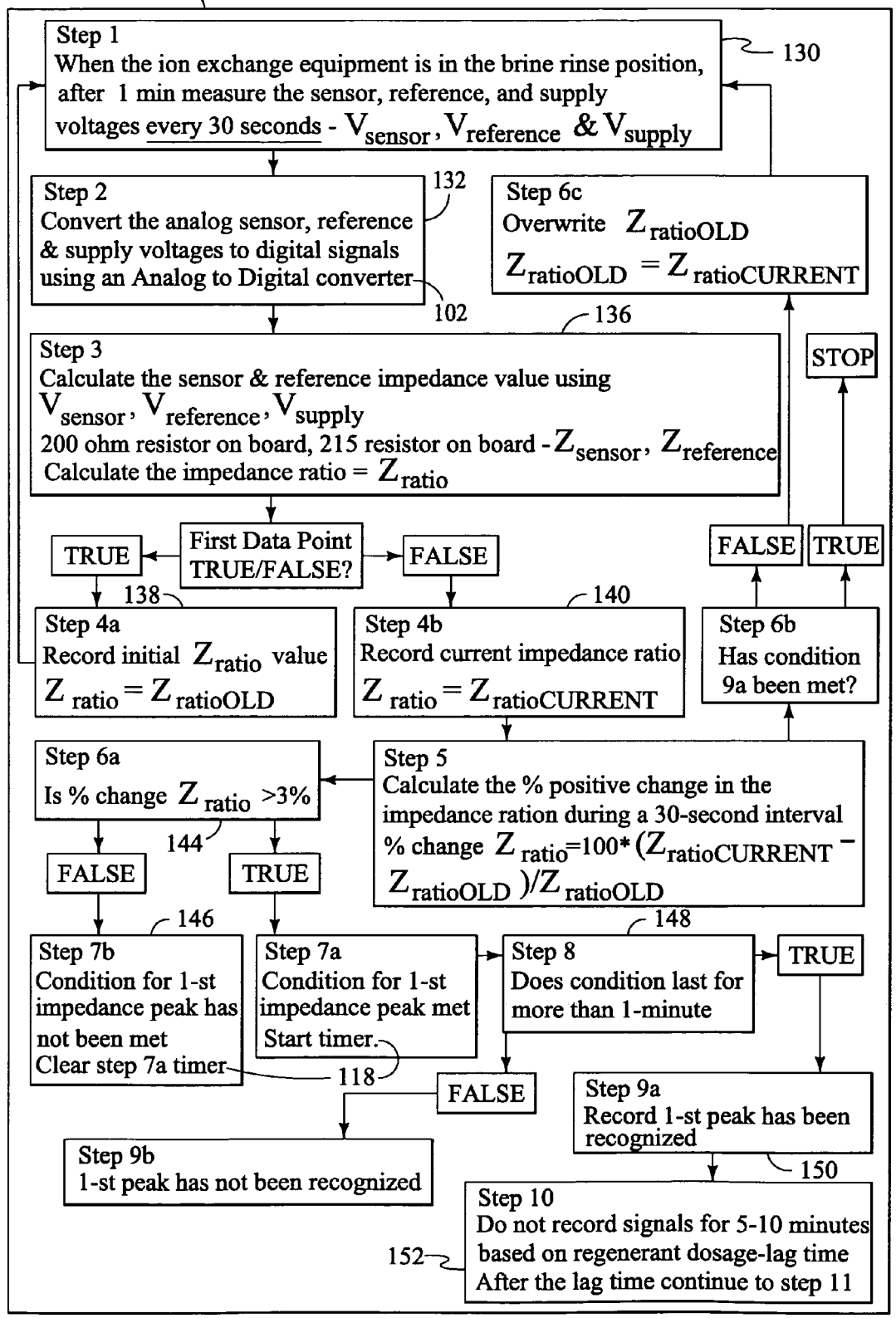
FIG. 4 is a flow diagram of a process for determining the first peak in the regeneration step.
Figure 5:
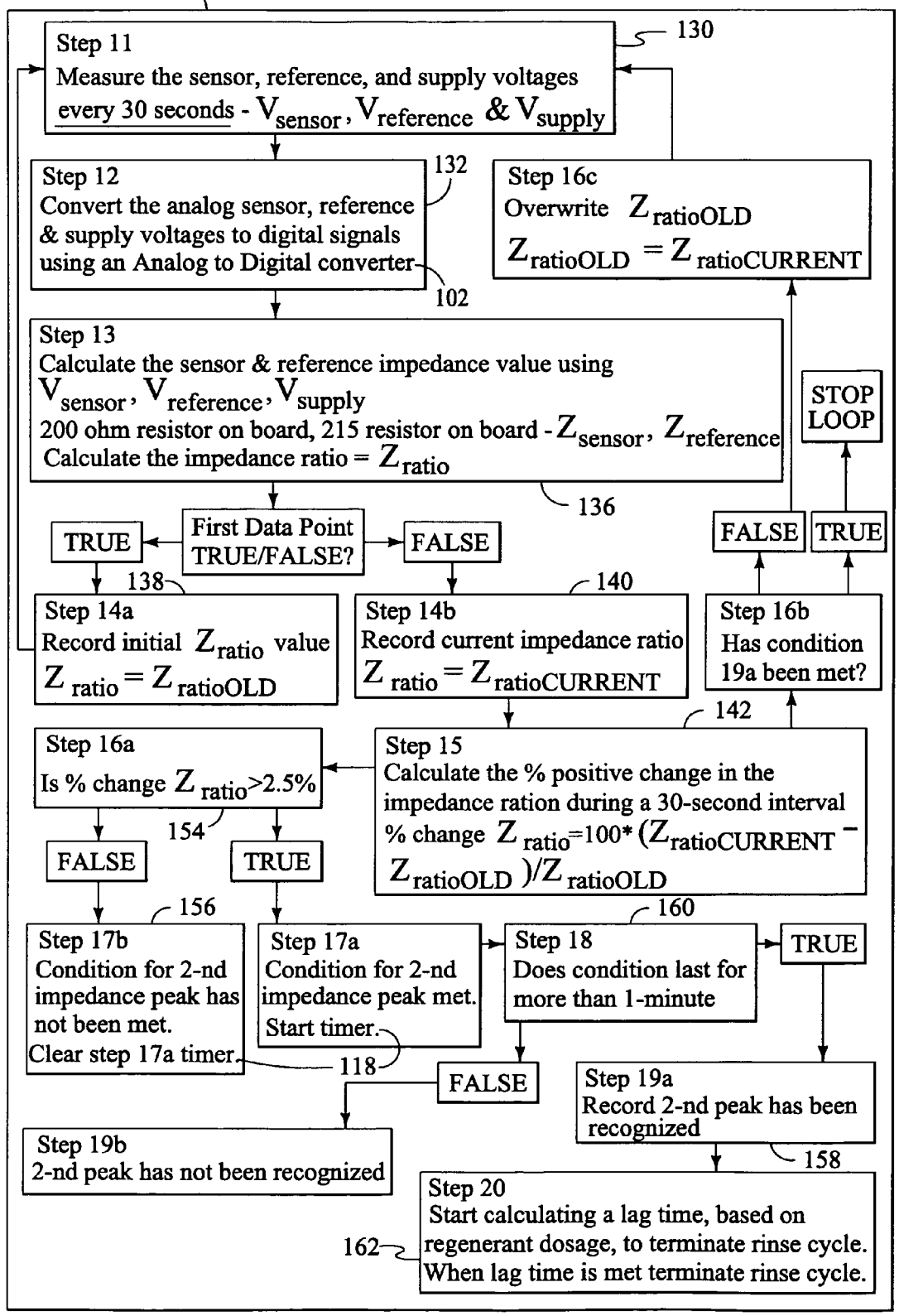
FIG. 5 is a flow diagram of a process for determining the second peak and the end of the regeneration step.

In one preferred embodiment shown in FIGS. 3-5, the microprocessor 50 in the controller 20 is programmed to perform a certain series of steps to carry out the preferred process. During the service step shown in FIG. 3, at 100 the controller 20 measures the voltage of the reference probe, the sensor probe and the supply line at thirty-second intervals. These voltage signals are preferably analog type signal measurements. An Analog to Digital signal converter 102 or a microprocessor 50 with a built in Analog to Digital Converter, such as those made by Hitachi (Tokyo, Japan), NEC (Princeton, N.J.) and Toshiba (Irvine, Calif.), are preferably provided in the controller 20 to convert at 104 the analog signals to digital voltage signals.

Impedance values for the reference probe 54 and the sensor probe 56 are calculated at 106 using the voltage values and the known values of the reference resistors $R_1$, $R_2$ on the Wheatstone bridge 62 using equations IX and X. The impedance ratio of the two sensors 54, 56 is also calculated at 106 using equation XI. If this is the first data point in the service step, the current impedance ratio is recorded at 108 as the minimum impedance ratio and the controller awaits the time for the next thirty-second reading.

For subsequent readings in the service step, the current impedance ratio is recorded at 110, then compared at 112 to the minimum impedance ratio. If the current impedance ratio is less than the minimum impedance ratio, the minimum impedance ratio is reset at 114 to the current value. The percent change in the impedance ratio is calculated at 116 and compared to the predetermined increase and if it does not exceed 7.5%, a condition timer 118 is cleared at 120 and the controller 20 again awaits the next time interval. When the change in the impedance ratio exceeds 7.5%, the condition timer 118 starts at 122. If the change in impedance ratio drops below 7.5% within 6 minutes, the peak is considered to be erroneous and regeneration is not initiated. Percentages and time intervals may vary to suit the application.

However, referring to step 124, if the change in impedance ratio lasts for at least 6 minutes, then the controller 20 takes the steps necessary to initiate regeneration 126 at an appropriate time. Regeneration may be initiated immediately or it may be delayed according to an appropriate criteria. At this time, the controller stops at 128 initiating thirty-second readings of the voltage of the reference probe 54, the sensor probe 56 and the electrical supply line.

Once regeneration is initiated as shown in FIG. 4, a different program is initiated to determine the duration of the brine/slow rinse step. After one minute into the brine/slow rinse cycle, the controller 20 begins measuring at 130 the voltage of the reference probe 54, the sensor probe 56 and the supply line (not shown). The analog signals are converted at 132 to digital signals using the same converter 102 as was discussed in the service step above. Calculations are performed at 136 to obtain the impedance of each probe and the impedance ratio. If this is the first data point in the current regeneration step, a value for the current impedance ratio is assigned at 138 to an old impedance ratio, then the controller 20 awaits the next thirty-second interval to obtain new voltages.

For subsequent data points in the current regeneration step, the current impedance ratio is recorded at 140 and the percentage rate of change in the impedance ratio is calculated at 142 as the difference between the current impedance ratio and the old impedance ratio divided by the old impedance ratio. If at step 144 the rate of change increases less than 2%, no peak is detected, the controller 20 clears at step 146 a step timer and the controller looks for the next thirty-second time interval. If the increase in the rate of change in the impedance ratio exceeds more than about 2% in a 30 second interval and is maintained for at least 30 seconds, the first peak has been detected.

After detection of the first peak, a lag time may be inserted at 152 whereby the controller needs not record signals for a time when no peak is expected. For example, the lag time can last for about 5 minutes to about 30 minutes, preferably at least 15 minutes. These times will vary, for example, depending on the flow rate of the water and the positioning of the reference probe 54 and the sensor probe 56 relative to each other, and the salt dosage. In other words, the lag time is introduced between the detecting of the first peak and beginning monitoring for the second peak. Preferably, the lag time is at least 15 minutes.

Referring to FIG. 5, following detection of the first peak the controller resumes measuring at 130 the voltage of the sensor probe 56, the reference probe 54 and the supply line, as well as conversion at 132 of the values from analog to digital, calculating at 136 the impedances and impedance ratio, assigning at 138 the first impedance ratio as the old impedance ratio, recording at 140 the current impedance ratio and calculating at 142 the percent change in the impedance ratio as for the first peak above.

If the rate of change in the impedance ratio does not meet the minimum rate change, the second peak has not been recognized at 156 and the controller 20 resets the condition timer 118 and awaits the next thirty-second measurement at 130. The second peak is recognized at 158 when the rate of change of the impedance ratio is determined at 154 to be greater than 2% and the condition is maintained at 160 for more than 30 seconds in the condition timer 118. Following recognition of the second peak, the controller schedules at 162 termination of the regeneration step, either immediately or delayed by regenerant dosage, time of day or other event. The brine/slow rinse cycle is terminated when the second peak is not detected. If desired, a subsequent alarm program step is initiated if the second peak is not timely detected.

Although the Wheatstone bridge 62 (FIG. 2) continuously monitors the voltage, it is recorded at time intervals for use in calculations. The time interval useful in determining the rate of change in the impedance ratios is less than the duration of the peaks it is trying to detect, preferably between 10 and 60 seconds and more preferably between 20 and 40 seconds. Preferably the time intervals are regularly spaced.

While a particular embodiment of the present method for determining the duration of steps in a regeneration sequence has been shown and described, it will be appreciated by those skilled in the art that changes and modifications may be made thereto without departing from the invention in its broader aspects and as set forth in the following claims.

What is claimed is:

1. A method for determining the duration of a brine/slow rinse cycle in a process cycle for a water conditioner having a bed of ion-exchange material, comprising:

positioning a sensor probe and a reference probe in the bed of ion-exchange material vertically displaced from each other, with the sensor probe upstream of the reference probe;

monitoring a voltage from each of the sensor probe and the reference probe over a plurality of time intervals;

calculating a rate of change in the impedance ratio of the sensor probe to the reference probe;

detecting a first peak in a rate of change between time intervals of impedance ratios of the sensor probe to the reference probe;

repeating said monitoring, calculating and detecting steps until a second peak is detected; and terminating the brine/slow rinse cycle after both peaks have been detected.

2. The method of claim 1 wherein said detecting step comprises identifying a rate of change in impedance ratios of at least 2% per 30 seconds.

3. The method of claim 1 wherein upon repetition, said detecting step comprises identifying a rate of change in impedance ratios of at least 2% per 30 seconds.

4. The method of claim 1 further comprising introducing a lag time between said detecting of the first peak and beginning monitoring for the second peak.

5. The method of claim 4 wherein said lag time is at least 15 minutes.

6. The method of claim 1 further comprising termination of the brine/slow rinse cycle when the second peak is not detected.

7. The method of claim 6 further comprising initiating a subsequent alarm program step if the second peak is not timely detected.

8. The method of claim 1 wherein the reference probe and the sensor probe are variable resistors.

9. The method of claim 1 wherein said monitoring and said calculating steps are performed with the aid of a microprocessor.

10. The method of claim 1 wherein said monitoring and calculating steps are performed with the aid of a bridge circuit.

* * * * *